US012604193B2

(12) United States Patent
Cheng et al.

(10) Patent No.: US 12,604,193 B2
(45) Date of Patent: Apr. 14, 2026

(54) AUTOMATIC SWITCHING METHOD FOR INTRUSION DETECTION FUNCTION AND WIRELESS DETECTION SYSTEM CAPABLE OF AUTOMATICALLY SWITCHING INTRUSION DETECTION FUNCTION

(71) Applicant: WISTRON NEWEB CORPORATION, Hsinchu (TW)

(72) Inventors: Chui-Chu Cheng, Hsinchu (TW); Horen Chen, Hsinchu (TW); Yi-An Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 131 days.

(21) Appl. No.: 18/489,073

(22) Filed: Oct. 18, 2023

(65) Prior Publication Data

US 2024/0137769 A1 Apr. 25, 2024
US 2024/0236683 A9 Jul. 11, 2024

(30) Foreign Application Priority Data

Oct. 20, 2022 (TW) .................................. 111139846

(51) Int. Cl.
*H04W 88/18* (2009.01)
*G08B 25/10* (2006.01)
*H04W 12/121* (2021.01)
*H04W 64/00* (2009.01)
*H04W 84/12* (2009.01)

(52) U.S. Cl.
CPC ......... *H04W 12/121* (2021.01); *H04W 64/00* (2013.01); *H04W 84/12* (2013.01)

(58) Field of Classification Search
None
See application file for complete search history.

(56) References Cited

U.S. PATENT DOCUMENTS 9,961,079 B1* 5/2018 Wang ................... H04L 63/0876
9,972,177 B1* 5/2018 Kashyap ........... G08B 13/2491
(Continued)

FOREIGN PATENT DOCUMENTS

CN 104699005 A 6/2015
CN 112566043 A 3/2021

*Primary Examiner* — Christopher B Robinson
(74) *Attorney, Agent, or Firm* — McClure, Qualey & Rodack, LLP

(57) ABSTRACT

An automatic switching method for an intrusion detection function and a wireless detection system capable of automatically switching an intrusion detection function are provided. The automatic switching method is suitable for a wireless detection system with the intrusion detection function, and the wireless detection system includes a wireless router and a detector set in an intrusion detection range. The method includes: detecting wireless signals of target mobile devices in a whitelist to generate detection results; determining whether the target mobile devices are within the intrusion detection range according to the detection results; in response to determining that one of the target mobile devices is within the intrusion detection range, configuring the wireless router to disable the intrusion detection function; and in response to determining that none of the target mobile devices is within the intrusion detection range, configuring the wireless router to enable the intrusion detection function.

20 Claims, 7 Drawing Sheets

(56) References Cited

U.S. PATENT DOCUMENTS

| | | | |
|---|---|---|---|
| 10,594,716 B2 * | 3/2020 | Mehner | H04L 63/1441 |
| 2013/0212680 A1 * | 8/2013 | Winn | H04L 51/212 |
| | | | 726/23 |
| 2013/0281005 A1 * | 10/2013 | Causey | H04W 12/08 |
| | | | 455/411 |
| 2017/0264615 A1 * | 9/2017 | Yasaki | H04L 41/0803 |
| 2019/0080573 A1 | 3/2019 | Micko et al. | |
| 2019/0141059 A1 * | 5/2019 | Shimizu | H04L 63/1441 |
| 2019/0349760 A1 * | 11/2019 | Fong | H04W 12/02 |
| 2021/0006570 A1 * | 1/2021 | Nakai | H04L 63/1416 |
| 2021/0042592 A1 | 2/2021 | Hashimoto et al. | |
| 2022/0161758 A1 * | 5/2022 | Moeller | B60R 25/31 |
| 2022/0252709 A1 * | 8/2022 | Duan | G01S 7/006 |

* cited by examiner

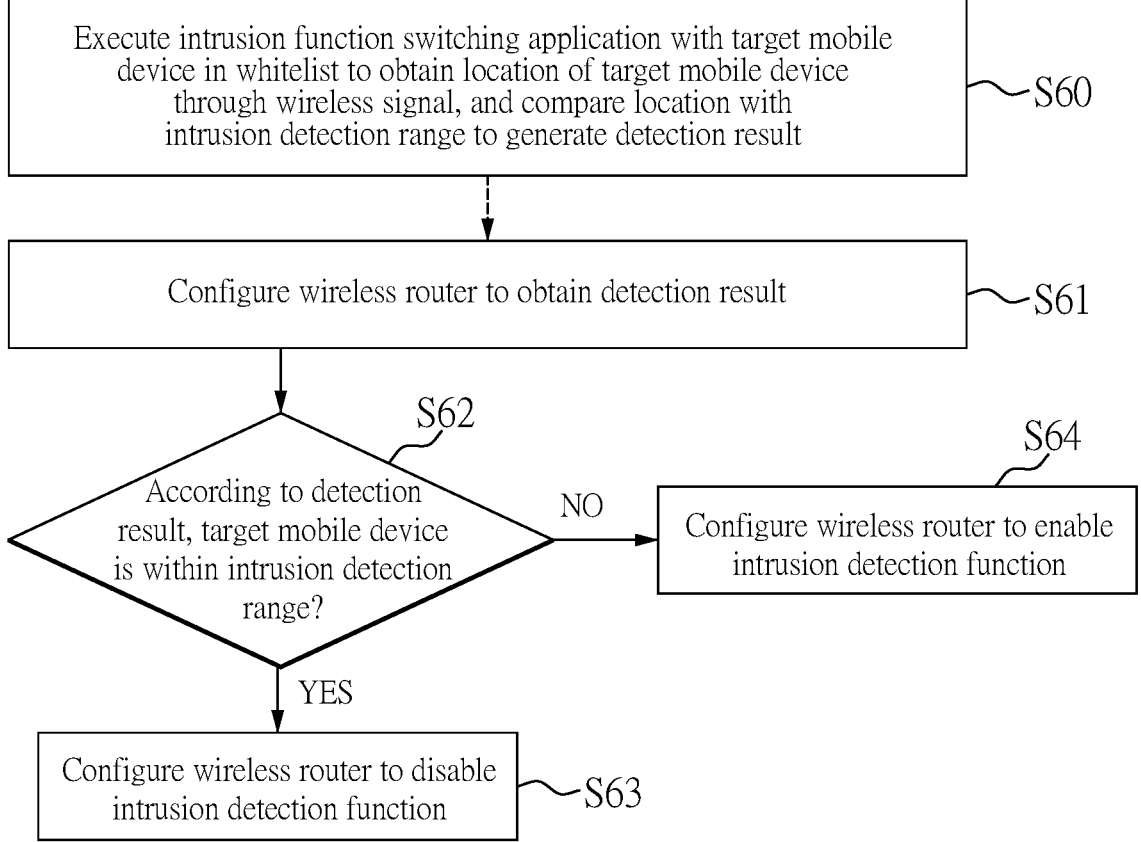

Execute intrusion function switching application with target mobile device in whitelist to obtain location of target mobile device through wireless signal, and compare location with intrusion detection range to generate detection result    ∼S60

Configure wireless router to obtain detection result    ∼S61

S62

According to detection result, target mobile device is within intrusion detection range?

NO

S64

Configure wireless router to enable intrusion detection function

YES

Configure wireless router to disable intrusion detection function    ∼S63

AUTOMATIC SWITCHING METHOD FOR INTRUSION DETECTION FUNCTION AND WIRELESS DETECTION SYSTEM CAPABLE OF AUTOMATICALLY SWITCHING INTRUSION DETECTION FUNCTION

CROSS-REFERENCE TO RELATED PATENT APPLICATION

This application claims the benefit of priority to Taiwan Patent Application No. 111139846, filed on Oct. 20, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method and system, and more particularly to an automatic switching method for an intrusion detection function and a wireless detection system capable of automatically switching an intrusion detection function.

BACKGROUND OF THE DISCLOSURE

Wireless sensing technology can use existing Wi-Fi signals to detect motions (like walking, falling etc.), gestures, and biometric features (like estimating breathing rate), which adds valuable Wi-Fi application in supporting home security, medical and health care, enterprise, and building management. The Wi-Fi sensing technology can be built upon existing standard, hardware, infrastructure, and deployments of Wi-Fi, including operable on any equipment with Wi-Fi capability such as Wi-Fi router, smart phone, or Wi-Fi enabled Internet of Things devices.

One common application of the wireless sensing technology is home intrusion detection. However, the irregularity in people's everyday events leads to the user having to manually switch the detection function on and off several times in one day, and the inconvenience affects user's experience.

SUMMARY OF THE DISCLOSURE

In response to the above-referenced technical inadequacy, the present disclosure provides an automatic switching method for an intrusion detection function and a wireless detection system capable of automatically switch an intrusion detection function.

In order to solve the above-mentioned problems, one of the technical aspects adopted by the present disclosure is to provide an automatic switching method for an intrusion detection function that is suitable for a wireless detection system with the intrusion detection function. The wireless detection system includes a wireless router and a detector that is set in an intrusion detection range. The automatic switching method includes: detecting a wireless signal of at least one target mobile device in a whitelist to generate a detection result; according to the detection result, determining whether the at least one target mobile device is within the intrusion detection range; in response to determining that one of the at least one target mobile device is within the intrusion detection range, configuring the wireless router to disable the intrusion detection function; and in response to determining that none of the at least one target mobile device is within the intrusion detection range, configuring the wireless router to enable the intrusion detection function.

In order to solve the above-mentioned problems, another one of the technical aspects adopted by the present disclosure is to provide a wireless detection system capable of automatically switching an intrusion detection function. The wireless system includes a detector and a wireless router. The detector is set in an intrusion detection range, and the wireless router is configured to determine whether at least one target mobile device in a whitelist is within the intrusion detection range according to a detection result. The detection result is generated through detecting a wireless signal of the at least one target mobile device in the whitelist. In response to determining that one of the at least one target mobile device in the whitelist is within the intrusion detection range, the wireless router disables the intrusion detection function. In response to determining that none of the at least one target mobile device is within the intrusion detection range, the wireless router enables the intrusion detection function.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 6 is a flowchart of an automatic switching method according to a second embodiment of present disclosure.

DETAILED DESCRIPTION OF THE EXEMPLARY EMBODIMENTS

Figure 1:
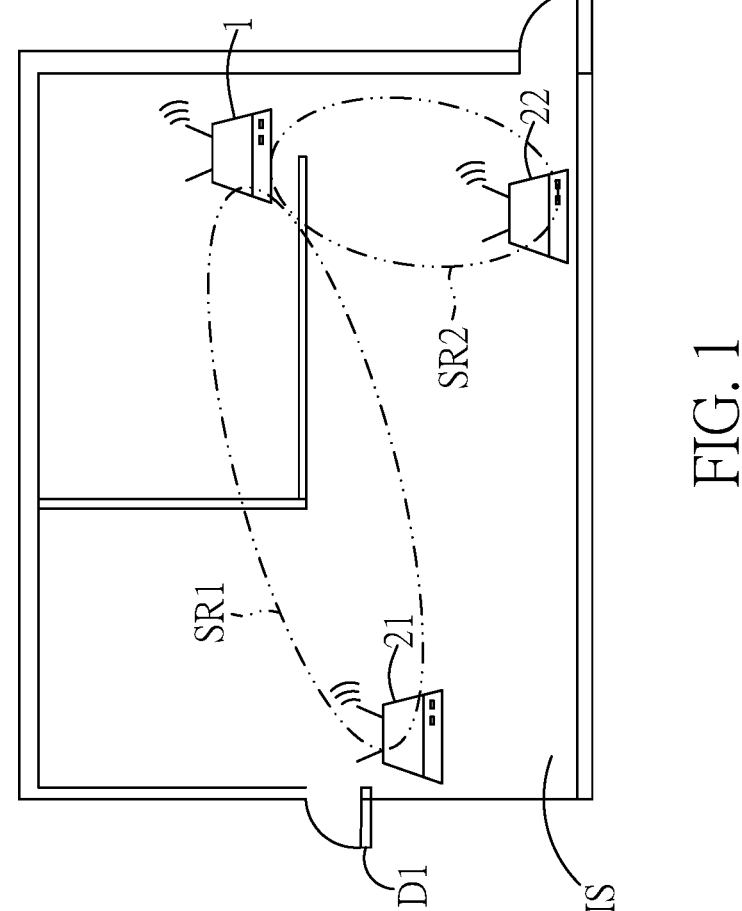
FIG. 1 is a schematic diagram illustrating an arrangement of a wireless detection system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1, a first embodiment of the present disclosure provides a wireless detection system 100 capable of automatically switching an intrusion detection function. The wireless detection system 100 includes a wireless router 1 and at least one detector 21, 22 as shown in FIG. 1.

It is to be noted that the indoor space IS can be considered to be the intrusion detection range, and the detectors 21, 22 are set in the intrusion detection range (indoor space). As shown in FIG. 1, at least a signal transmitter and a signal receiver are required to execute WI-FI sensing, which in turn performs the environment sensing technology, and in the first embodiment, the wireless router 1 serves as the signal receiver that receives signals from multiple signal transmitters (in this case, the detectors 21, 22) to detect activities in the room. In specific, a sensing zone SR1 is formed between the wireless router 1 and the detector 21, and a sensing zone SR2 is formed between the wireless router 1 and the detector 22.

It is to be noted that the wireless router 1 and the detectors 21, 22 in the embodiments of the present disclosure are not limited to the arrangement of one signal receiver plus multiple signal transmitters, they can also be arranged to be multiple transceivers or one signal transmitter plus multiple signal receivers, as long as the wireless signals transmitted between the signal receiver and the signal transmitter vary in reaction to the activities in the intrusion detection range.

Figure 2:
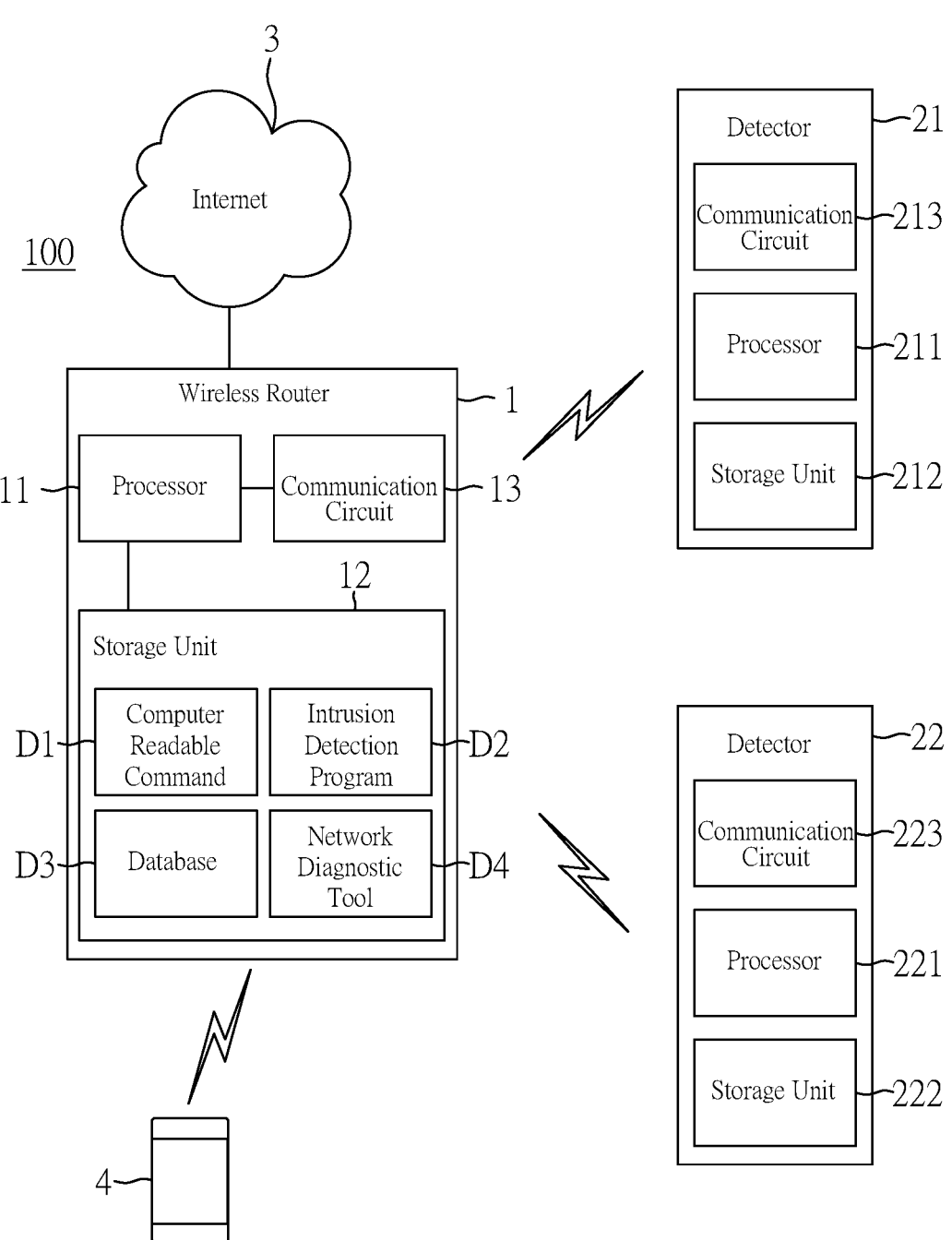
FIG. 2 is a functional block diagram of the wireless detection system according to the first embodiment of the present disclosure.

Further referring to FIG. 2, the wireless router 1 is, for example, a wireless access point device that includes a processor 11, a storage unit 12 connected to the processor 11, and a communication circuit 13 connected to the processor 11. The processor 11 is configured to execute commands of a software or a firmware in the storage unit 12. In particular implementations, the processor 11 is one single processor, a combination of multiple processors, or a multi-core processor.

In the embodiments of the present disclosure, the storage unit 12 is, for example but not limited to, a hard disk driver, a solid-state disk, or any other storage device that can store data, and the storage unit 12 is configured to at least store a plurality of computer readable commands D1, an intrusion detection program D2, a database D3, and a network diagnostic tool D4. Moreover, the communication circuit is connected to the processor 11 and configured so that the wireless router 1 and the detectors 21, 22 are in communicative connection, and that the wireless router 1 is connected to a network 3, for example, through a wireless communication protocol that conforms to IEEE 802.11 standard which includes 802.11 a/b/g/n/ac/ax standards.

In this embodiment, the communication circuit 13 includes an antenna, and the processor 11 is configured to execute a plurality of computer readable commands D1 to control the antenna of the communication circuit 13 to transmit or receive wireless signals in the same or similar or different frequency band and in different directions and/or different polarization directions.

Furthermore, the detector 21 includes a processor 211, a storage unit 212 connected to the processor 211, and a communication circuit 213 connected to the processor 211. The processor 211, the storage unit 212, and the communication circuit 213 are similar to the processor 11, the storage unit 12, and the communication circuit 13. On the other hand, the detector 22 includes a processor 221, a storage unit 222 connected to the processor 221, and the communication circuit 223 connected to the processor 221, which are similar to that of the detector 21 in frame structure and function, and therefore will not be described herein.

In this embodiment, the wireless detection system 100 is a detection system that is suitable for an indoor environment and detects intrusion based on indoor activities. In this embodiment, the wireless signals propagate to the wireless router 1 from the detectors 21, 22, and during the transmission, the detector 21, serving as a transmitter, sends multiple carrier along multiple paths to the wireless router 1 which senses the response of channel state information (CSI). In wireless transmission, multi-path is a propagation phenomenon in which radio frequency signals reach the receiving antenna through two or more different paths. The CSI obtained under multi-path transmission is an information with channel properties of a communication link that can be used for channel estimation.

More specifically, CSI describes how a signal propagates from a transmitter to a receiver and represents the combined effect of, for example, scattering, fading, and power decay with distance, which is quite effective for inferring motion and activity behavior in indoor spaces. It can therefore be used for intrusion detection in specific areas.

Therefore, based on the above-mentioned method, the wireless router 1 can be configured to enable or disable the intrusion detection function. In some embodiments, the wireless router 1 and the detectors 21, 22 can always maintain a communication connection. When the intrusion detection function is enabled, the processor 11 is configured to execute the intrusion detection program D2 to notify or control the detectors 21, 22 to start transmitting wireless signals related to the intrusion detection function to the wireless router 1, and then obtain the CSI of the wireless signal to analyze the activity level in the sensing zones SR1, SR2 to determine whether an intrusion event has occurred. However, the above-mentioned method of determining whether there is an intrusion event is just an example, and the present invention does not limit the specific implementation of the intrusion detection function on the premise of detecting changes in the indoor environment based on changes in wireless signals. On the other hand, when the intrusion detection function is disabled, the above-mentioned judgment mechanism for intrusion events is not executed.

Although the above-mentioned method can detect intrusion events, it is still quite inconvenient for the user to manually set the intrusion detection function on-and-off.

Hence, the present disclosure also provides an automatic switching method for an intrusion detection function that is suitable for the wireless detection system 100 with the intrusion detection function as shown in FIG. 1 and FIG. 2, but the present disclosure is not limited thereto.

Figure 3:
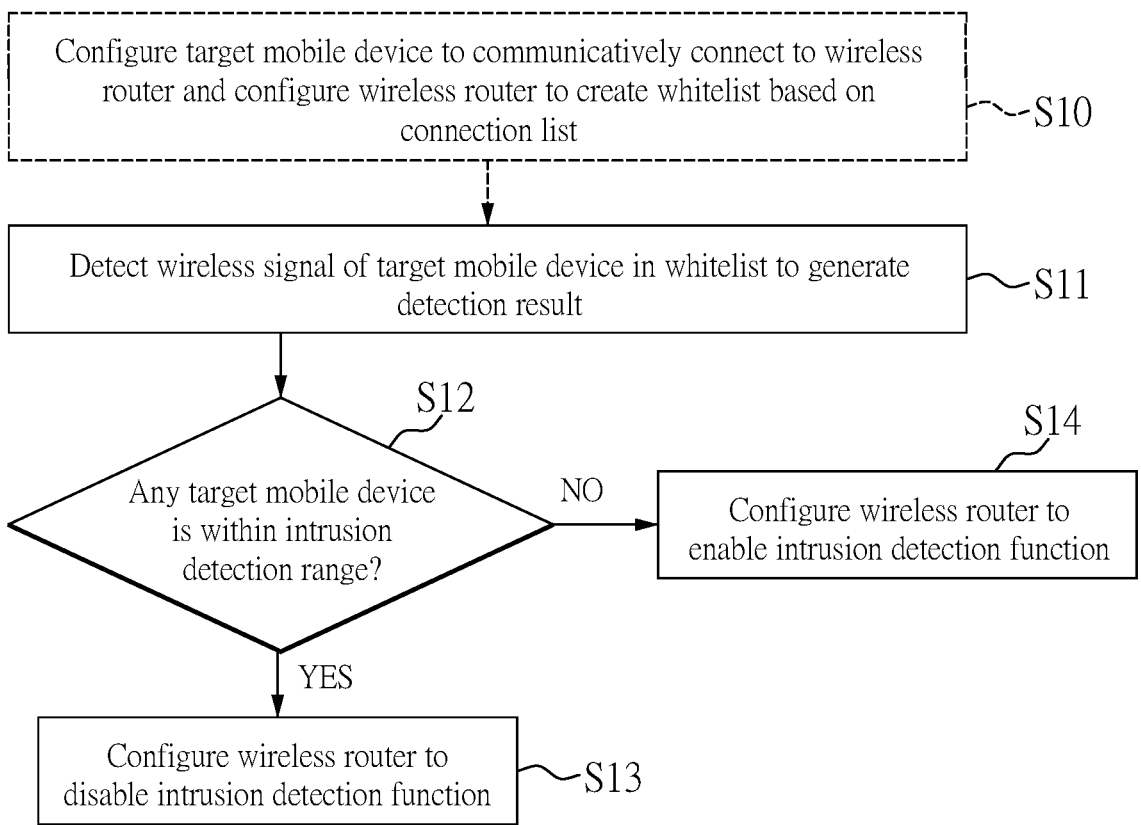
FIG. 3 is a flowchart of an automatic switching method for an intrusion detection function according to the first embodiment of the present disclosure.

Referring to FIG. 3, the automatic switching method includes the following steps:

Step S11: detecting wireless signals of target mobile devices in a whitelist to generate a detection result.

Step S12: according to the detection result, determining whether any one of the target mobile devices is in an intrusion detection range.

In response to determining that any one of the target mobile devices is in the intrusion detection range, the automatic switching method proceeds to step S13: configuring a wireless router to disable the intrusion detection function.

In response to determining that none of the target mobile devices is in the intrusion detection range, the automatic switching method proceeds to step S14: configuring the wireless router to enable the intrusion detection function.

Taking a home environment as an example, a device supporting Wi-Fi communication can access the Internet through the wireless router 1. Therefore, optionally, the automatic switching method can perform step S10 before step S11. In step S10, the target mobile device is configured to communicatively connect to the wireless router, and the wireless router is configured to create the whitelist based on a connection list of the wireless router. The so-called target mobile devices may include all devices with wireless communication capabilities in the home, and the number thereof may be one or more. Generally speaking, the processor 11 can be configured to execute the network diagnostic tool D4 (e.g., network mapper (Nmap)) to view the connection list (e.g., association list) to understand detailed information of the connected device. The detailed information includes device type, MAC address, and signal strength of the target mobile device. Then, the device types and MAC addresses of all mobile devices in the connection list are put in the whitelist and stored in the database D3. Thus, whether the conditions for disabling the intrusion detection function are met can be determined by determining whether a device in the whitelist is in the intrusion detection range.

In more detail, the association list can display the received signal strength between all devices connected to the wireless router 1 and the wireless router 1, which can be represented by an RSSI value. When the connected device is closer to the wireless router 1, the signal strength is stronger. Usually, most of the smart mobile devices that people carry would memorize the connection SSID and password of the wireless router 1 at home. Therefore, if the user is at home or very close to home, the mobile device they carry will automatically connect to the wireless router. And so it is possible to know whether a family member has entered the home or is near the home through the association list established by the wireless router 1.

Figure 4:
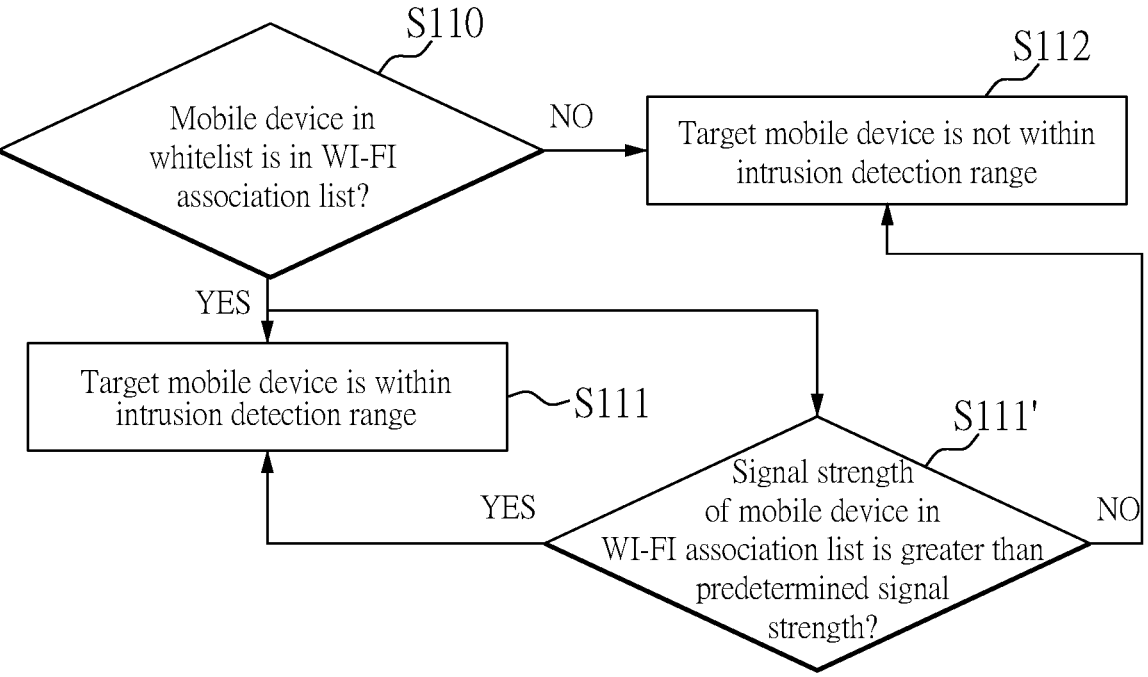
FIG. 4 is a detailed flowchart of steps S10 and S11 shown in FIG. 3.

Referring to FIG. 4, in steps S10 and S11, the wireless router 1 is further configured to perform the following steps:

Step S110: determining whether any of the mobile devices in the whitelist is in the WI-FI association list to generate the detection result. In the automatic switching method, the phone type mobile device is more directly correlated to user's location, and so by first determining whether a device type of any MAC address in the WI-FI association list is a phone type in this step, whether the target mobile device is within the intrusion detection range can be quickly determined.

When the detection result shows that a mobile device in the whitelist is in the WI-FI association list, step S111 is performed in which the target mobile device is determined to be within the intrusion detection range.

When the detection result shows that none of the mobile devices in the whitelist is in the WI-FI association list, step S112 is performed in which the target mobile device is determined to be not within the intrusion detection range.

However, in some circumstances, the signal range of the wireless router 1 could be larger than the intrusion detection range, and thus step S111' is further performed after the detection result of a mobile device in the whitelist being in the WI-FI association list. In step S111', it is determined whether the signal strength of the mobile device in the whitelist that is in the WI-FI association list is greater than a predetermined signal strength, if affirmative, the automatic switching method proceeds to step S111, and if negative, the automatic switching method proceeds to step S112.

Specifically, the relationship between the received signal strength and the distance variation between any target mobile device and the wireless router 1 can be recorded in advance, and the received signal strength when the target mobile device is leaving the intrusion detection range is set to be the predetermined signal strength, so as to provide a baseline for more accurately determining whether a mobile device is within the intrusion detection range.

Figure 5:
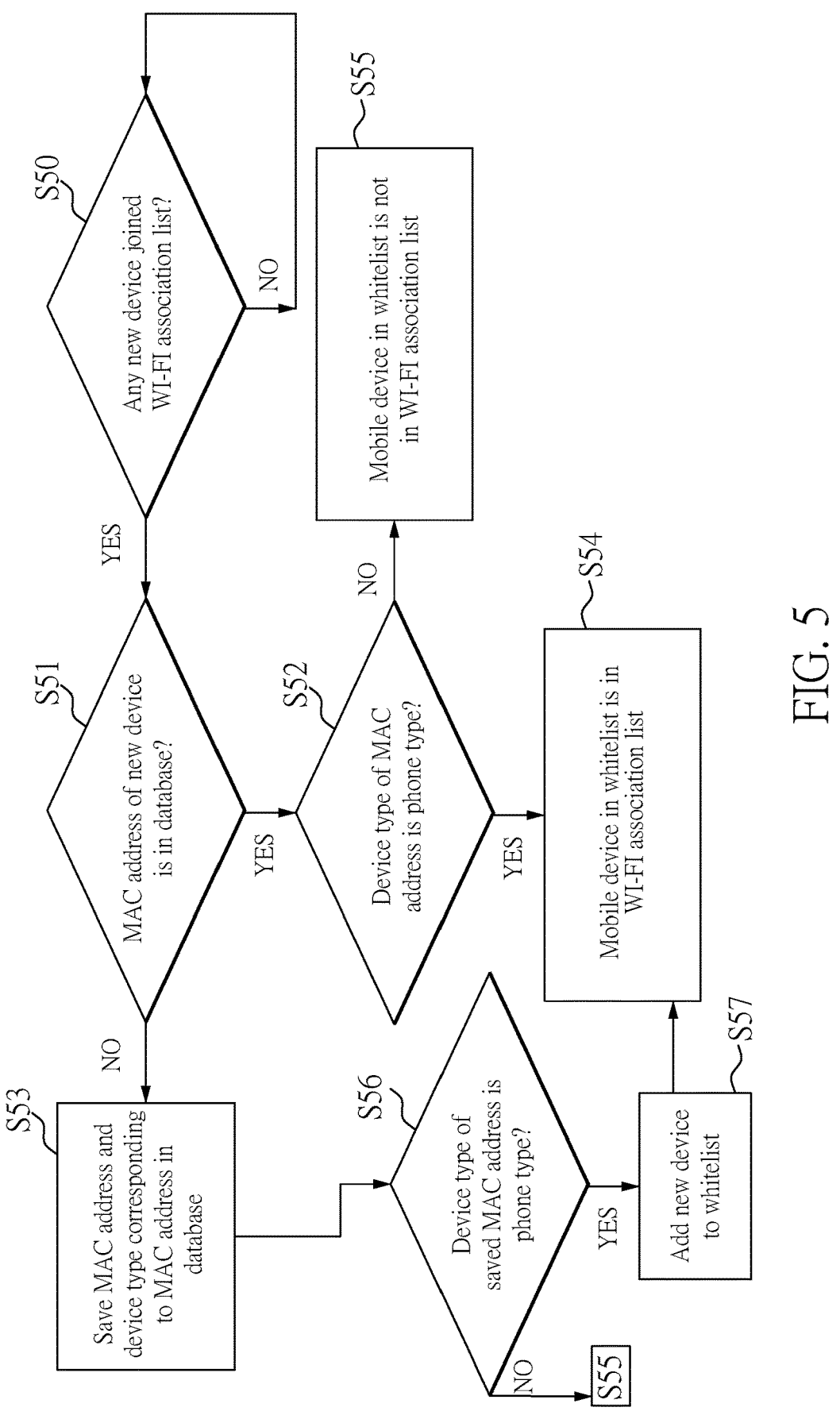
FIG. 5 is another flowchart of the automatic switching method according to the first embodiment of the present disclosure.

Referring to FIG. 5, the automatic switching method provided by the present invention also has corresponding join and judgement mechanisms for newly added devices outside the whitelist. As shown in FIG. 5, the automatic switching method also includes configuring wireless router 1 to perform the following steps:

Step S50: detecting whether any new device has joined the WI-FI association list. It should be noted that the new device in this step refers to any mobile device that just connected with the wireless router 1, for example, the mobile device 4 in FIG. 2. If no new device has joined the WI-FI association list, step S50 is repeated until the addition of a new device to the WI-FI association list has been detected.

In response to detecting that a new device had joined the WI-FI association list, step S51 is performed: determining whether a MAC address of the new device is in a database. Specifically, in the embodiments of the present invention, two types of data can be stored in the database D3. One type is devices that have been or appeared in the association list and are phone type devices, and these devices are classified as whitelist devices. The other type is devices that have been or appeared in the association list but are not phone type devices. Since these non-phone type devices have less direct correlation with user's location, they are only stored in the database and not included in the whitelist, but can be used for filtering at-home wireless devices that are constantly in communicative connection to the wireless router 1. In response to determining that the MAC address of the new device is in the database, step S52 is performed, and in response to determining that the MAC address of the new device is not in the database, step S53 is performed.

Step S52: determining whether the device type of the MAC address is phone type. This step is performed to see if more determination of whether the new device should be included in the whitelist is needed.

Step S53: saving the MAC address and the device type of the MAC address (device type corresponding to the MAC address) in the database. This step is performed to record the new device data.

In response to determining that the device type of the MAC address is phone type in step S52, step S54 is performed in which the mobile device in the whitelist is determined to be in the WI-FI association list. In other words, if the device was recorded in the database D3 and is a phone type device, the device is directly determined to be one of the mobile devices included in the whitelist.

In response to determining that the device type of the MAC address is not phone type in step S52, step S55 is performed in which the mobile device in the whitelist is determined not to be in the WI-FI association list. In other words, if the device was recorded in the database D3 but is not a phone type device, the device is directly determined to be not one of the mobile devices included in the whitelist.

After step S53, step S56 is performed: determining whether the device type of the saved MAC address is phone type. If affirmative, step S57 is performed in which the new device is added to the whitelist, and then step S54 is performed. If the device type of the saved MAC address in step S56 is determined to be not phone type, then step S55 is performed.

After Step S54, a similar step like S111 in FIG. 4 can be performed to determine whether the new device is within the intrusion detection range through checking signal strength, and so will not be described in detail herein.

Hence, in the first embodiment, the enablement and disablement of the intrusion detection function can be determined by determining whether a target mobile device in the whitelist is within the intrusion detection range. Moreover, by determining the device type and signal strength of the connected device, the target mobile devices in the whitelist can be quickly filtered out and the accuracy of the determination can be improved.

However, the aforementioned details are disclosed for exemplary purposes only, and are not meant to limit the scope of the present disclosure.

Second Embodiment

Figure 7:
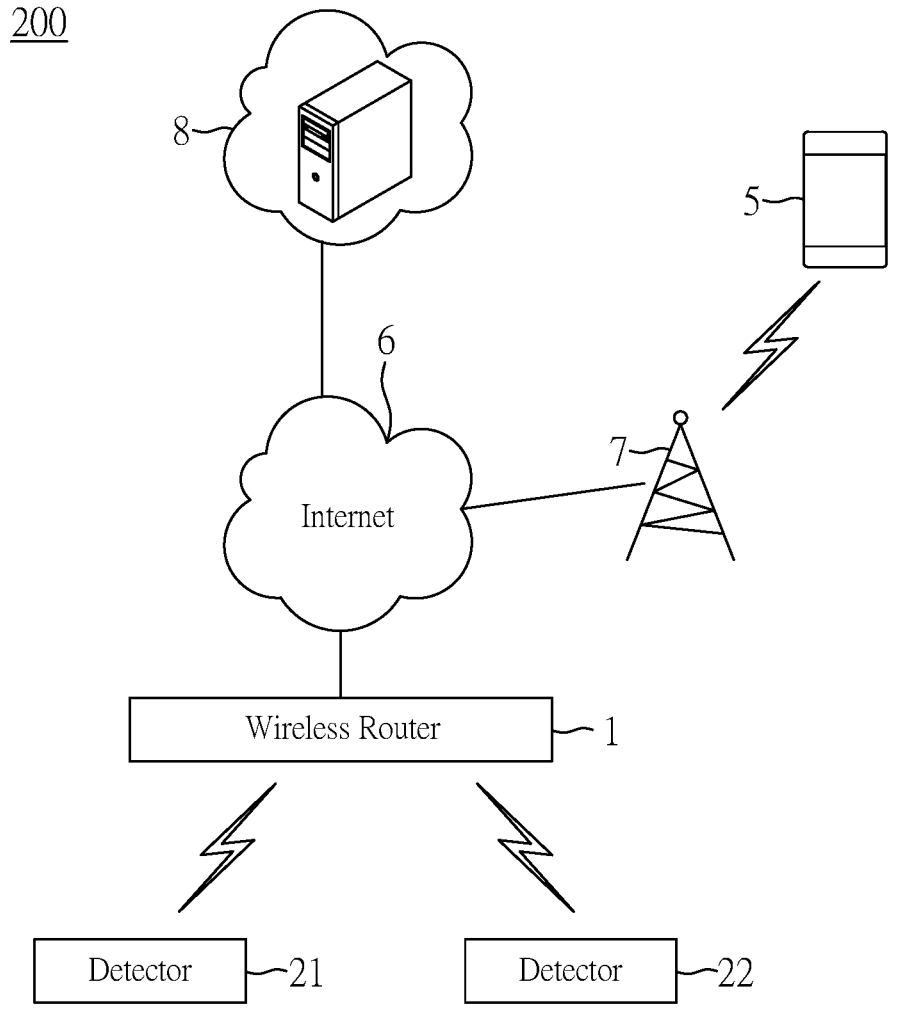
FIG. 7 is a schematic infrastructural diagram illustrating a wireless detection system capable of automatically switching an intrusion detection function according to the second embodiment of the present disclosure.

Referring to FIG. 6 and FIG. 7, a second embodiment of the present disclosure provides an automatic switching method for an intrusion detection function and a wireless detection system 200. The wireless detection system 200 includes a wireless router 1 and detectors 21, 22 that are similar to that in FIG. 2 and so will not be described herein. The automatic switching method according to the second embodiment is applicable to the wireless detection system 100, 200 with an intrusion detection function, but the present disclosure is not limited thereby.

The second embodiment is different from the first embodiment in that the existing connection capability and positioning capability of the mobile device is further utilized to integrate with application program to achieve the goal of automatically switching the intrusion detection function. It is to be noted that the target mobile device and the any mobile device mentioned in the present disclosure all at least include a processor, a memory, and a wireless communication circuit that are similar to the processor 11, the storage unit 12, and the communication circuit 13 of the wireless router 1.

As shown in FIG. 6, besides the steps shown in FIG. 3, the automatic switching method further includes the following steps:

Step S60: executing an intrusion function switching application with the target mobile device in the whitelist to obtain a location of the at target mobile device through the wireless signal, and compare the location with the intrusion detection range to generate the detection result.

In the wireless detection system 200 of this embodiment, user can access the internet 6 by using the target mobile device 5 through mobile communication network such as long-term evolution (LTE) network or fifth generation (5G) network. As such, the target mobile device 5 is able to communicate with at least one base station 7, establish mobile communication network, and execute a positioning procedure to obtain its location.

It is noted that both LTE network and 5G network support positioning capability. LTE positioning accuracy is about 20 meters, and for 5G positioning, the enhancement of the 5G updated version Release 16 can meet the indoor and outdoor accuracy of 3 meters and 10 meters respectively. In the 5G updated version Release 17, the positioning accuracy of 20 to 30 centimeters can be achieved, so it can be used to accurately determine whether the target mobile device 5 is within the set intrusion detection range.

Further, in addition to the method of establishing a whitelist using a connection list mentioned in the first embodiment, this second embodiment also provides another method of establishing a whitelist. Specifically, in this embodiment, when the wireless router 1 is deployed in the indoor space IS, the user can execute the intrusion function switching application with the target mobile device 5 to setup the setting of the wireless router 1, so as to allow the wireless router 1 to connect to the Internet 6 and provide a wireless communication environment for the detectors 21, 22 to be in communicative connection with the wireless router 1. At the same time, the whitelist can be generated correspondingly when the user uses the intrusion function switching application. For example, the intrusion function switching application can provide a registration interface where the user can input the information of the corresponding target mobile device 5 and the set location of the intrusion detection range (for example, the corresponding address of the indoor space IS), thereby generating a corresponding whitelist while deploying the wireless router 1.

Therefore, after the target mobile device 5 corresponding to the whitelist obtains its own location, the location is compared with the set location of the intrusion detection range input by the user. For example, when the location is within a predetermined distance from the set location, a comparison result that the target mobile device 5 is within the intrusion detection range is generated, and the comparison result is sent to the wireless router 1 as the detection result.

Step S61: configuring the wireless router to obtain the detection result. Since both the wireless router 1 and the target mobile device 5 can directly access the internet 6, the target mobile device 5 is able to send the detection result to the wireless router 1 by executing the intrusion function detection application.

In other embodiments, the target mobile device 5 can also execute the intrusion function switching application to connect to a cloud server 8 for data transmission to send its location and the set location of the intrusion detection range to the cloud server 8. The cloud server 8 conduct the location comparison and sends the detection result to the wireless router 1. In other words, in this embodiment, the set location of the intrusion detection range and the location of the target mobile device can be stored on the client end (target mobile device 5) or the cloud end (cloud server 8), and the location comparison of the target mobile device and the intrusion detection range can be performed at the client end or the cloud end. The present disclosure does not limit where the above-mentioned information is stored nor who compares the above-mentioned information.

Step S62: determining whether the target mobile device is within the intrusion detection range according to the detection result.

When setting the intrusion detection range, the detailed location of the intrusion detection range on the ground (such as an address) can be set based on the location of the wireless router 1 itself or directly by the user through the aforementioned intrusion function switching application. Thus, after obtaining the detection result, the wireless router 1 can directly determine whether the target mobile device 5 is within the intrusion detection range, and determine whether to enable or disable the intrusion detection function. And because 5G mobile network can provide extremely high-precision positioning capabilities, the accuracy in determining whether the target mobile device in the whitelist is within the intrusion detection range is further improved.

However, the aforementioned details are disclosed for exemplary purposes only, and are not meant to limit the scope of the present disclosure.

Beneficial Effects of the Embodiments

In conclusion, the automatic switching method for an intrusion detection function and the wireless detection system according to the present disclosure have the following advantages. First, the enablement or disablement of the intrusion detection function is based on whether the target mobile device is in the whitelist. Second, the target mobile device in the whitelist can be quickly filtered out and the determination accuracy can be enhanced by determining the device type and the signal strength of the connected device. Furthermore, the automatic switching method and the wireless detection system according to the present disclosure utilize existing connection capability and positioning capability of the mobile device to integrate with an application to achieve the goal of automatically switching the intrusion detection function. The high-precision positioning capability of the 5G mobile network further improves the determination accuracy of whether the target mobile device in the whitelist is within the intrusion detection range.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An automatic switching method for an intrusion detection function, suitable for a wireless detection system with the intrusion detection function, wherein the wireless detection system comprises a wireless router and a detector set in an intrusion detection range, the intrusion detection function of the wireless router is enabled, the automatic switching method comprising:

detecting, by the detector set, a wireless signal of at least one target mobile device in a whitelist to generate a detection result;

controlling, by the wireless router, the detector set to start transmitting the detection result to the wireless router;

determining, by the wireless router, whether the at least one target mobile device is within the intrusion detection range according to the detection result;

in response to determining that one of the at least one target mobile device is within the intrusion detection range, automatically disabling the intrusion detection function of the wireless router; and in response to determining that none of the at least one target mobile device is within the intrusion detection range, automatically maintaining the intrusion detection function of the wireless router.

2. The automatic switching method according to claim 1, further comprising:

configuring the wireless router to determine whether at least one mobile device in the whitelist is in a WI-FI association list to generate the detection result;

wherein, when the detection result is that the at least one mobile device in the whitelist is in the WI-FI association list, the at least one target mobile device is determined to be within the intrusion detection range;

wherein, when the detection result is that none of the at least one mobile device in the whitelist is in the WI-FI association list, none of the at least one target mobile device is determined to be within the intrusion detection range.

3. The automatic switching method according to claim 2, further comprising:

determining whether a device type of any MAC address in the WI-FI associated list is a phone type to determine whether the at least one mobile device in the whitelist is in the WI-FI association list.

4. The automatic switching method according to claim 3, wherein, determining whether at least one mobile device in the whitelist is in the WI-FI association list to generate the detection result further comprises:

detecting whether any new device has joined the WI-FI association list;

in response to detecting that a new device had joined the WI-FI association list, determining whether a MAC address of the new device is in a database of the wireless router;

in response to determining that the MAC address of the new device is in the database, determining whether the device type of the MAC address is the phone type; and in response to determining that the device type of the MAC address is the phone type, determining that the at least one mobile device in the whitelist appears in the WI-FI association list.

5. The automatic switching method according to claim 4, further comprising:

in response to determining that the MAC address of the new device is not in the database, saving the MAC address and the device type of the MAC address in the database.

6. The automatic switching method according to claim 5, further comprising:

determining whether the saved device type of the MAC address is the phone type;

in response to determining that the saved device type of the MAC address is the phone type, adding the new device to the whitelist.

7. The automatic switching method according to claim 1, further comprising:

executing an intrusion function switching application with the at least one target mobile device in the whitelist to obtain a location of the at least one target mobile device through the wireless signal, and compare the location with the intrusion detection range to generate the detection result; and configuring the wireless router to obtain the detection result.

8. The automatic switching method according to claim 7, wherein, obtaining the location of the at least one target mobile device through the wireless signal further comprises:

configuring the at least one target mobile device to communicate with at least one base station to establish a mobile communication network, and execute a positioning procedure to obtain the location.

9. The automatic switching method according to claim 8, wherein the mobile communication network is a long-term evolution (LTE) network or a fifth-generation (5G) network.

10. The automatic switching method according to claim 7, further comprising:

configuring the at least one target mobile device to execute the intrusion function switching application to send the location to a cloud server; and configuring the cloud server to obtain the location, compare the location with the intrusion detection range to generate the detection result, and send the detection result to the wireless router.

11. A wireless detection system capable of automatically switching an intrusion detection function, the wireless detection system comprising:

a detector set in an intrusion detection range, wherein the detector set detects a wireless signal of at least one target mobile device in a whitelist to generate a detection result;

a wireless router, wherein the intrusion detection function of the wireless router is enabled and the wireless router is configured to control the detector set to start transmitting the detection result to the wireless router and determine whether the at least one target mobile device in the whitelist is within the intrusion detection range according to the detection result;

wherein, in response to determining that one of the at least one target mobile device is within the intrusion detection range, the instruction detection function of the wireless router is automatically disabled; and wherein, in response to determining that none of the at least one target mobile device is within the intrusion detection range, the instruction detection function of the wireless router is automatically maintained.

12. The wireless detection system according to claim 11, wherein the wireless router is configured to determine whether at least one mobile device in the whitelist is in the WI-FI association list to generate the detection result;

wherein, when the detection result is that the at least one mobile device in the whitelist is in the WI-FI association list, the wireless router determines the at least one target mobile device to be within the intrusion detection range;

wherein, when the detection result is that none of the at least one mobile device in the whitelist is in the WI-FI association list, the wireless router determines the at least one target mobile device is not within the intrusion detection range.

13. The wireless detection system according to claim 12, wherein the wireless router is further configured to determine whether a device type of any MAC address in the WI-FI association list is a phone type to determine whether the at least one mobile device in the whitelist is in the WI-FI association list.

14. The wireless detection system according to claim 12, wherein the step of the wireless router determining whether the at least one mobile device in the whitelist is in the WI-FI association list to generate the detection result further comprises:

detecting whether any new device has joined the WI-FI association list;

in response to detecting that a new device had joined the WI-FI association list, determining whether a MAC address of the new device is in a database of the wireless router;

in response to determining that the MAC address of the new device is in the database of the wireless router, determining whether a device type of the MAC address is the phone type; and in response to determining that the device type of the MAC address is the phone type, determining that the at least one mobile device in the whitelist is in the WI-FI association list.

15. The wireless detection system according to claim 14, wherein, in response to determining that the MAC address of the new device is not in the database, the wireless router save the MAC address and the device type of the MAC address to the database.

16. The wireless detection system according to claim 15, wherein the wireless router is further configured to determine whether the device type of the saved MAC address is the phone type; and in response to determining that the device type of the save MAC address is the phone type, the new device is added to the whitelist.

17. The wireless detection system according to claim 11, wherein the at least one target mobile device in the whitelist is configured to execute an intrusion function switching application to obtain a location of the at least one target mobile device through the wireless signal, and compare the location with the intrusion detection range to generate the detection result; and wherein, the wireless router is further configured to obtain the detection result, and determine whether the at least one target mobile device is within the intrusion detection range according to the detection result.

18. The wireless detection system according to claim 17, wherein the at least one target mobile device is configured to communicate with at least one base station to establish a mobile communication network, and execute a positioning procedure to obtain the location.

19. The wireless detection system according to claim 18, wherein the mobile communication network is an LTE network or a 5G network.

20. The wireless detection system according to claim 17, further comprising:

a cloud server, in communication with the at least one mobile device and the wireless router, wherein the at least one mobile device is configured to execute the intrusion function switching application to send the location to the cloud server, and the cloud server is configured to obtain the location, compare the location with the intrusion detection range to generate the detection result, and send the detection result to the wireless router.

\* \* \* \* \*